United States Patent
Kuriyama et al.

(10) Patent No.: US 6,617,420 B2
(45) Date of Patent: Sep. 9, 2003

(54) PROCESS FOR REDUCING MONOMER CONTENT IN N-VINYL COMPOUND POLYMERS

(75) Inventors: Toshiaki Kuriyama, Osaka (JP); Yasuko Inui, Nara (JP)

(73) Assignees: Nippon Shokubai Co., Ltd., Osaka (JP); Dai-Ichi Kogyo Seiyaku Co., Ltd., Kyoto (JP)

( * ) Notice: Subject to any disclaimer, the term of this patent is extended or adjusted under 35 U.S.C. 154(b) by 0 days.

(21) Appl. No.: 09/920,745

(22) Filed: Aug. 3, 2001

(65) Prior Publication Data

US 2002/0022699 A1 Feb. 21, 2002

(30) Foreign Application Priority Data

Aug. 11, 2000 (JP) .................................... P. 2000-243586

(51) Int. Cl.[7] ............................. C08F 26/00; C08F 26/06
(52) U.S. Cl. ..................... 528/480; 528/486; 528/487; 528/491
(58) Field of Search ............................... 528/486, 480, 528/487, 491

(56) References Cited

U.S. PATENT DOCUMENTS

| 4,795,802 A | 1/1989 | Nuber et al. | 528/482 |
| 5,175,248 A | 12/1992 | Costin et al. | 528/487 |
| 5,225,524 A * | 7/1993 | Plochocka et al. | 528/482 |
| 5,239,053 A | 8/1993 | Tseng et al. | 528/483 |
| 5,830,964 A | 11/1998 | Liu et al. | 526/264 |

FOREIGN PATENT DOCUMENTS

| JP | 7-503749 | 4/1995 | C08F/6/00 |
| JP | 7-59606 | 6/1995 | C08F/6/10 |

* cited by examiner

*Primary Examiner*—Donald R. Wilson
(74) *Attorney, Agent, or Firm*—Sughrue Mion, PLLC

(57) ABSTRACT

A method for residual monomer diminution by which a residual monomer is speedily removed from an N-vinyl compound polymer or the like without posing a problem such as an increase in ash content; and a process for producing an N-vinyl compound polymer solution or powder which has a regulated pH and is free from a decrease in pH with time. The method comprises adding an organic acid having a boiling point of 140° C. or higher at ordinary pressure to an aqueous solution of an N-vinyl compound polymer. The process comprises adding an organic base to an aqueous N-vinyl compound polymer solution having a pH lower than 7.0 to thereby neutralize the solution and regulate the pH thereof. Those operations are conducted in a reaction vessel in which a gaseous phase is regulated so as to have an oxygen concentration of 5.0% by volume or lower.

7 Claims, No Drawings

PROCESS FOR REDUCING MONOMER CONTENT IN N-VINYL COMPOUND POLYMERS

FIELD OF THE INVENTION

The present invention relates to a method for diminishing residual monomers contained in an N-vinyl compound polymer. The invention further relates to a process for producing an N-vinyl compound polymer solution or powder having a regulated pH.

DESCRIPTION OF THE RELATED ART

N-vinylpyrrolidone, N-vinylcaprolactam, N-vinyloxazolidone, N-vinylacetamide, N-vinylformamide, N-vinylimidazole and the like have advantages of biocompatibility, safety, hydrophilicity, etc., and therefore are utilized in various uses. In particular, N-vinylpyrrolidone makes it possible to synthesize polymers having a broad range of molecular weight of about 10 to 100 in terms of K value as determined by the Fikentscher's method, and such polymers are extensively used in various fields such as medicines, cosmetics, pressure-sensitive and other adhesives, coatings, dispersants, inks and electronic parts. Further, crosslinked vinylpyrrolidone polymers are useful as a water-absorbing resin in various applications where water absorption and water retention are required, e.g., paper diapers. By the way, there is the case that unpolymerized monomers may often remain in those N-vinyl compound polymer products. Amount of the monomer remained is generally in a level of 1% to several hundreds ppm, but even such a small amount of the residual monomers poses problems concerning, in particular, a fear of toxicity and odor. In recent years, there is a growing desire for diminishing the residual monomers contained in N-vinyl compound polymer products for use especially in medicines and cosmetics. Methods for removing a residual monomer from a vinylpyrrolidone polymer have been proposed. For example, JP-B-7-59606 (the term "JP-B" as used herein means an "examined Japanese patent publication") proposes a method in which an aqueous vinylpyrrolidone polymer solution is treated with an adsorbent. Further, JP-W-7-503749 (the term "JP-W" as used herein means an "unexamined published PCT application") proposes a method which comprises adding carbonic acid, formic acid, acetic acid, phosphoric acid or sulfuric acid to an aqueous vinyllactam polymer solution and heating the resulting mixture at 50 to 150° C. Use of an inorganic hydroxide as an example of a neutralizing agent to be used after the acid treatment is described therein.

The method disclosed in JP-B-7-59606 has a drawback that the aqueous solution to be treated by this method should be regulated so as to have a viscosity of 200 mPa·s or lower and, hence, the method is unsuitable for use in the treatment of polymers having a high viscosity. Further, for use of an adsorbent such as ion-exchanged resins, complicated procedures such as pre-washing or regeneration treatment of adsorbent must be conducted, resulting in increase of production costs.

The method disclosed in JP-W-7-503749 has a drawback that when carbonic acid, formic acid or acetic acid, which each are a volatile acid, is used at a reaction temperature of 80° C. or higher, then the acid volatilizes to escape from the system or move to the gaseous phase. As a result, it becomes impossible to maintain the pH of the solution at a desired value, making it difficult to speedily diminish the residual monomer. On the other hand, when the reaction temperature is reduced to 80° C. or lower, it becomes difficult to speedily diminish the residual monomer although acid volatilization is reduced. Furthermore, there have been cases where the acid volatilizes during the drying of the polymer solution, making it impossible to obtain a dried polymer having a desired pH value. A further problem of the proposed method is that use of an inorganic acid such as phosphoric acid or sulfuric acid results in an increased ash content in the resulting aqueous solution or in the dried solid. It has further been found the problem that where oxygen has entered in a reaction system, molecular weight of polymer reduces.

Moreover, there is a problem that in the case where an acid is added to an N-vinyl compound polymer to lower than pH of the system to below 7.0, the polymer deteriorates with the lapse of time, resulting in a decrease in molecular weight and, in the case of an aqueous solution, a decrease in solution viscosity. In addition, there has been a further problem that when an aqueous polymer solution having a pH lower than 7.0 is dried at a high temperature exceeding 100° C., the molecular weight of the polymer decreases. JP-W-7-503749 proposes a technique in which the polymer treated with an acid is neutralized with an inorganic hydroxide. However, use of an inorganic hydroxide poses a problem that the resultant aqueous solution or dried solid has an increased ash content. Furthermore, the present inventors have found that there is a problem that the presence of an inorganic hydroxide lowers the pH of the aqueous polymer solution or of the dried solid during drying or with the lapse of time and even deteriorates the polymer.

SUMMARY OF THE INVENTION

Accordingly, one object of the invention is to provide a method for diminishing residual monomers contained in N-vinyl compound polymers which can speedily diminish the amount of residual monomers to less than 100 ppm, preferably less than 10 ppm, and also is free from the drawbacks described above.

Another object of the invention is to provide a process for producing an N-vinyl compound polymer solution or powder having a regulated pH and free from the drawbacks described above.

As a result of intensive investigations to overcome the above drawbacks, it has been found that a method effective for diminishing a residual monomer comprises adding an organic acid having a boiling point of 140° C. or higher at ordinary pressure to an aqueous solution of an N-vinyl compound polymer. The organic acid having a boiling point of 140° C. or higher at ordinary pressure according to the invention does not volatilize even at high temperatures and functions to maintain the pH of the solution constant. Consequently, the residual monomer can be speedily diminished, whereby a polymer solution or a dried polymer each having a desired pH can be easily obtained. Furthermore, an ash-free aqueous polymer solution and an ash-free dried solid can be obtained.

A method for diminishing a residual N-vinyl compound monomer has further been found, which comprises adding at least one acid to an aqueous solution of an N-vinyl compound polymer, wherein the gaseous phase in the reaction vessel is regulated so as to have an oxygen concentration of 5.0% by volume or lower. When this method of the invention in which the gaseous phase in the reaction vessel is regulated so as to have an oxygen concentration of 5.0% by volume or lower is used, for example, vinyllactam polymer is prevented from suffering a decrease in K value (determined by the Fikentscher's method) even when treated with an acid at high temperatures. Thus, a vinyllactam polymer having a desired value of K can be obtained with satisfactory reproductivity.

As a result of further intensive investigations, there has been found a process for producing an aqueous N-vinyl compound polymer solution which comprises adding an organic base to an aqueous N-vinyl compound polymer solution containing an acid and having a pH lower than 7.0 to thereby neutralize the solution and regulate the pH thereof. By using an organic base according to this process of the invention, not only an ash-free aqueous solution and an ash-free dried solid can be obtained, but also the pH of the pH-regulated aqueous solution can be maintained constant over a prolonged period of time. Thus, an N-vinyl compound polymer which suffers no change in K value or pH during drying and during storage after drying and has excellent stability with the passage of time can be obtained.

The invention provides a method for diminishing a residual monomer which comprises adding an organic acid having a boiling point of 140° C. or higher at ordinary pressure to an aqueous solution of an N-vinyl compound polymer.

The invention further provides a method for diminishing a residual monomer which comprises adding at least one acid to an aqueous solution of an N-vinyl compound polymer, wherein a gaseous phase in the reaction vessel is regulated so as to have an oxygen concentration of 5.0% by volume (hereinafter referred to as "vol %") or lower.

The invention furthermore provides a process for producing an aqueous N-vinyl compound polymer solution which comprises adding an organic base to an aqueous N-vinyl compound polymer solution having a pH lower than 7.0 to thereby regulate the pH of the solution.

The invention still further provides a process for producing an N-vinyl compound polymer powder which comprises drying the aqueous polymer solution which has undergone the pH regulation.

DESCRIPTION OF THE PREFERRED EMBODIMENTS

The present invention is described in detail below.

Examples of the N-vinyl compound polymer include homopolymers of N-vinylcaprolactams such as N-vinyl-2-pyrrolidone, N-vinyl-5-methyl-2-pyrrolidone, N-vinyl-2-piperidone, N-vinyl-6-methyl-2-piperidone, N-vinyl-$\epsilon$-caprolactam and N-vinyl-7-methyl-$\epsilon$-caprolactam; N-vinylamides such as N-vinylacetamide, N-vinylformamide, N-vinyl-N-methylacetamide and N-vinyl-N-methylformamide; N-vinyl imides such as N-vinylmaleimide and N-vinylphthalimide; and N-vinyl compounds such as N-vinyloxazolidone; and copolymers.

The copolymers are constituted of the above N-vinyl compounds and comonomers copolymerizable therewith. The comonomers to be copolymerized are not particularly limited. Examples thereof include 1) (meth)acrylic esters such as methyl (meth)acrylate, ethyl (meth)acrylate, butyl (meth)acrylate, cyclohexyl (meth)acrylate, and hydroxyethyl (meth)acrylate; 2) (meth)acrylamide and derivatives thereof such as N-methyl(meth)acrylamide, N-ethyl(meth)acrylamide, and N,N-dimethyl (meth) acrylamide; 3) basic unsaturated monomers and salts or quaternized derivatives thereof, such as dimethylaminoethyl (meth)acrylate, dimethylaminoethyl(meth)acrylamide, vinylpyridine, and 2-vinylimidazole; 4) carboxyl-containing unsaturated monomers and salts thereof, such as (meth) acrylic acid, itaconic acid, maleic acid, and fumaric acid; 5) anhydrides of unsaturated acids, such as maleic anhydride and itaconic anhydride; 6) vinyl esters such as vinyl acetate and vinyl propionate; 7) vinylethylene carbonate and derivatives thereof; 8) styrene and derivatives thereof; 9) 2-sulfonylethyl (meth)acrylate and derivatives thereof; 10) vinylsulfonic acids and derivatives thereof; 11) vinyl ethers such as methyl vinyl ether, ethyl vinyl ether, and butyl vinyl ether; and 12) olefins such as ethylene, propylene, octene, and butadiene. Of those, the comonomers 1) to 7) are particularly preferable from the standpoint of copolymerizability with N-vinyl compounds. The comonomers enumerated above may be used alone or in combination of two or more thereof in copolymerization.

The proportion of the N-vinyl compounds, such as vinylpyrrolidone and vinylcaprolactam, in all the monomer components constituting the N-vinyl compound polymer is not particularly limited. However, the proportion thereof is preferably 1.0 mol % or higher, more preferably 10.0 mol % or higher, most preferably 20.0 mol % or higher, based on all the monomer components. Proportion of the N-vinyl compound in the copolymer lower than 0.1 mol % is undesirable in that various properties attributable to N-vinyl compounds cannot be imparted to the copolymer.

The method of the invention is effective as a method for diminishing residual monomers in those N-vinyl compound polymers, and is preferably applied to N-vinyllactam polymers such as poly(N-vinylpyrrolidone), and is also preferably applied to N-vinyllactam polymers, such as N-vinylpyrrolidone, that are used in medicines or cosmetics, in which diminishing residual monomers is strongly demanded, and also to which regulation and stabilization of pH and molecular weight are strongly demanded in the fields of electronic materials and the like.

For obtaining an N-vinyl compound polymer, a polymerization reaction can be conducted by the conventional methods, e.g., bulk polymerization, solution polymerization, emulsion polymerization, suspension polymerization or precipitation polymerization. The polymerization reaction maybe conducted at suitable temperature according to conditions including reactants. However, the reaction temperature is preferably 0 to 250° C., more preferably 20 to 150° C., most preferably 40 to 100° C.

During the polymerization reaction, the reaction system may have any desired internal pressure. However, ordinary or elevated pressure is preferred when the reaction is conducted at high temperature. In the case where strict temperature control is necessary, it is preferred to conduct the reaction at ordinary pressure.

In conducting a polymerization reaction for obtaining an N-vinyl compound polymer, conventional polymerization initiators can be added. Examples of the initiator include free-radical polymerization initiators such as azo compounds, e.g., 2,2'-azobisisobutyronitrile and 2,2'-azobis (2-methylpropionamidine) dihydrochloride, and peroxides such as benzoyl peroxide and hydrogen peroxide; cationic polymerization initiators such as boron trifluoride and complexes thereof, iron(II) chloride, diethylaluminum chloride, diethylzinc, heteropolyacids, and activated clay; persulfates such as potassium persulfate, ammonium persulfate, and sodium persulfate; and redox initiators which are oxidizing agent/reducing agent combinations generating free radicals, such as a combination of ascorbic acid and hydrogen peroxide, combination of sodium sulfoxylate and t-butyl hydroperoxide, and combination of a persulfate and a metal salt. Although the concentration of the polymerization initiator in conducting the polymerization reaction is not particularly limited, it is preferably 0.001 to 10% by weight (hereinafter referred to as wt %), more preferably 0.005 to 5 wt %, most preferably 0.01 to 3 wt %, based on the weight of the monomer components. Besides the polymerization initiator, any desired additives may be suitably used according to need in conducting the polymerization reaction, such as a chain transfer agent, pH regulator, and buffering agent.

Solvents which can be used for the polymerization reaction for obtaining an N-vinyl compound polymer are not particularly limited. Examples thereof include water; alcohols such as methyl alcohol, ethyl alcohol, isopropyl alcohol, and diethylene glycol; alkylene glycol ethers (ether acetates) such as propylene glycol monomethyl ether acetate and diethylene glycol monomethyl ether acetate; amides such as dimethylformamide and N-methylpyrrolidone; esters such as ethyl acetate, butyl acetate, and γ-butyrolactone; aliphatic hydrocarbons such as hexane and octane; alicyclic saturated hydrocarbons such as cyclohexane; alicyclic unsaturated hydrocarbons such as cyclohexene; aromatic hydrocarbons such as benzene, toluene, and xylene; ketones such as acetone and methyl ethyl ketone; halogenated hydrocarbons such as dichloroethane, chloroform, and carbon tetrachloride; ethers such as diethyl ether, dioxane, and tetrahydrofuran; sulfonic esters such as dimethyl sulfoxide; carbonic esters such as dimethyl carbonate and diethyl carbonate; and alicyclic carbonic esters such as ethylene carbonate and propylene carbonate. Of these solvents, ethers (ether acetates) and amides are preferably used, and water and alcohols are more preferably used. These solvents may be used alone or as a mixture of two or more thereof. These solvents are preferably used in an amount such that the concentration of the monomer components in the reaction mixture during polymerization is preferably 1 to 99 wt %, more preferably 5 to 70 wt %, most preferably 10 to 60 wt %.

The term "N-vinyl compound polymer" as used herein means one which may further contain residual monomers.

In the invention, an organic acid having a boiling point of 140° C. or higher at ordinary pressure is added to an aqueous solution of an N-vinyl compound polymer, such as a vinylpyrrolidone polymer, whereby the residual monomer contained in the polymer is diminished.

In the case where an N-vinyl compound polymer to be used is one synthesized with a non-aqueous solvent, the solvent is replaced with water or an aqueous solvent before the treatment of the polymer.

In the aqueous solution of an N-vinyl compound polymer to be treated by the invention, the term "aqueous" means that the solvent is water or a water/organic solvent mixture. The organic solvent to be mixed with water is not particularly limited so long as it is compatible with water. However, it is preferably an organic solvent comprising methanol or ethanol.

The organic acid to be used in the invention is not particularly limited so long as it has a boiling point of 140° C. or higher, and organic compounds having acid groups such as carboxyl group, sulfonic group, phosphoric group, sulfuric group and phosphoric group can be used. Examples of the organic compound include oxalic acid, succinic acid, aspartic acid, citric acid, glutamic acid, fumaric acid, malic acid, maleic acid, phthalic acid, trimellitic acid, pyromellitic acid, propionic acid, heptanoic acid, octanoic acid, glycolic acid, salicylic acid, lactic acid, L-ascorbic acid, benzoic acid, methanesulfonic acid, benzenesulfonic acid, laurylbenezenesulfonic acid, p-toluenesulfonic acid, benzenephosphric acid and lauryl sulfate. Of those, oxalic acid, succinic acid, aspertic acid, citric acid, glutamic acid, fumaric acid, malic acid, propionic acid, heptanioc acid, octanoic acid, glycolic acid, salicylic acid, lactic acid, L-ascorbic acid and benzoic acid are preferably used from the standpoint of safety. Further, oxalic acid and succinic acid are more preferably used from the standpoints of reduced discoloration, ease of pH control, etc. It is, of course, possible to use a mixture of two or more acids. For example, an oxalic acid/succinic acid mixture, oxalic acid/L-ascorbic acid mixture, succinic acid/L-ascorbic acid mixture, succinic acid/oxalic acid/L-ascorbic acid mixture, oxalic acid/propionic acid mixture, oxalic acid/heptanoic acid mixture, or succinic acid/propionic acid mixture can be used.

The amount of the organic acid added is not particularly limited. However, the amount thereof is preferably 0.0001 to 5 wt %, more preferably 0.001 to 0.5 wt %, based on the weight of the aqueous N-vinyl compound polymer solution. If the addition amount thereof is smaller than 0.0001 wt %, there are cases where the effect of residual monomer diminution is insufficient. If the amount thereof exceeds 5 wt %, there are cases where the polymer suffers a decrease in molecular weight or discoloration.

Although the viscosity of the aqueous N-vinyl compound polymer solution to be treated in the invention is not particularly limited, it is preferably 100,000 mPa·s or lower at room temperature. If the viscosity of the solution exceeds 100,000 mPa·s at room temperature, it is difficult to stir the solution by ordinary methods and there are cases where the effect of residual monomer diminution is insufficient.

The pH of the aqueous N-vinyl compound polymer solution to which an acid has been added is not particularly limited. However, the range of the pH thereof is preferably 1.5 to 6.0, more preferably 2.5 to 5.0. If the pH of the solution is lower than 1.5, there are cases where the N-vinyl compound polymer suffers a decrease in molecular weight. If the pH thereof exceeds 6.0, there are cases where the effect of residual monomer diminution is insufficient.

The temperature at which an acid is added to treat the aqueous N-vinyl compound polymer solution is not particularly limited. However, the temperature is preferably 25 to 150° C., more preferably 50 to 100° C. If the temperature is lower than 25° C., there are cases where the effect of residual monomer diminution is insufficient. If the temperature exceeds 150° C., there are cases where the polymer suffers a decrease in molecular weight or discoloration.

The time over which the polymer solution is maintained at that temperature after the acid addition is not particularly limited. However, the time is preferably 5 minutes to 24 hours, more preferably 10 minutes to 6 hours. If the time is shorter than 5 minutes, there are cases where the effect of residual monomer diminution is insufficient. If this period exceeds 24 hours, there are cases where the polymer suffers a decrease in molecular weight or discoloration.

Methods for adding an acid in the invention are not particularly limited. The acids may be added alone or may be added as a solution in water or an organic solvent.

On the other hand, after the addition of an acid, the resulting system may be allowed to stand. It is, however, preferred to stir the system from the standpoint of effectively removing the residual monomer. Especially in the case where the aqueous polymer solution has a viscosity of 100 mPa·s or higher, it is preferred to stir the solution with a stirring impeller for high-viscosity fluids, e.g., Max Blend Impeller or Super Blend Impeller, both manufactured by Sumitomo Heavy Industries Ltd.

In the process of the invention for producing an aqueous N-vinyl compound polymer solution which comprises adding an organic base to an aqueous polymer solution having a pH lower than 7.0 to thereby regulate the pH thereof, the organic base is not particularly limited. Examples thereof include monoethanolamine, diethanolamine, triethanolamine, guanidine carbonate, dihydrazide adipate, allylamine, diallylamine, triallylamine, isopropylamine, diisopropylamine, diaminopropylamine, ethylamine, diethylamine, triethylamine, 2-ethylhexylamine, 3-(2-ethylhexyloxy)propylamine, 3-ethoxypropylamine, diisobutylamine, 3-(diethylamino)propylamine, di-2-ethylhexylamine, 3-(dibutylamino)propylamine, tetramethylethylenediamine, hexamethylenediamine, tri-n-octylamine, t-butylamine, sec-butylamine, propylamine, 3-(methylamino)propylamine, 3-(dimethylamino) propylamine, N-methyl-3,3'-iminobis(propylamine), and 3-methoxypropylamine. Of these, the organic bases having a boiling point of 120° C. or higher at ordinary pressure are preferable, and triethanolamine, guanidine carbonate and dihydrazide adipate are particularly preferably used because pH regulation with these bases is easy and they have a high boiling point and, hence, cause no decrease in pH upon drying.

The term "pH" as used herein for an aqueous N-vinyl compound polymer solution used in the invention means the value of pH obtained by measuring the pH of the solution at 25° C. without changing the original concentration thereof.

The amount of the organic base to be added and the pH of the aqueous N-vinyl compound polymer solution after addition of the organic base are not particularly limited. However, the pH of the aqueous N-vinyl compound polymer solution is regulated to preferably 6.0 or higher, more preferably 7.0 or higher, most preferably 7.0 to 9.0. The amount of the organic base to be added depends on the kinds of the acid and organic base used. For example, the amount thereof is preferably 0.0001 to 5 wt %, more preferably 0.001 to 0.5 wt %, based on the weight of the aqueous N-vinyl compound polymer solution. If the pH of the solution to which the organic base has been added is lower than 6.0, there are cases where the N-vinyl compound polymer suffers a decrease in molecular weight with the lapse of time or upon drying.

The temperature of the aqueous N-vinyl compound polymer solution during addition of an organic base thereto is not particularly limited. However, the temperature thereof is preferably 10 to 150° C., more preferably 20 to 100° C. If the reaction temperature is lower than 10° C., there are cases where the neutralization reaction is insufficient. If the reaction temperature exceeds 150° C., there are cases where the N-vinyl compound polymer suffers a decrease in molecular weight or discoloration.

In the case where an acid is added to the aqueous N-vinyl compound polymer solution prior to the addition of an organic base thereto in the invention, the time interval of from the acid addition to the addition of the organic base is not particularly limited. However, the time interval is preferably 5 minutes to 24 hours, more preferably 10 minutes to 6 hours. If the time interval is shorter than 5 minutes, there are cases where the effect of the acid addition is insufficient when the acid is intended to diminish a residual monomer. If the time interval exceeds 24 hours, there are cases where the N-vinyl compound polymer suffers a decrease in molecular weight or discoloration before the addition of the organic base.

Methods for the addition of an organic base in the invention are not particularly limited. The organic base may be added alone or may be added as a solution in water or an organic solvent.

On the other hand, after addition of the organic base, the resulting system may be allowed to stand. It is, however, preferred to stir the system from the standpoint of effectively conducting the neutralization reaction. Especially in the case where the aqueous N-vinyl compound polymer solution has a viscosity of 100 mPa·s or higher, it is preferred to stir the solution with the above-described stirring impeller for high-viscosity fluids.

In the diminution of a residual N-vinyl compound monomer and/or the pH regulation of an aqueous N-vinyl compound polymer solution, particularly in diminishing the residual monomers by adding an acid to an aqueous N-vinyl compound polymer solution, it is preferred to regulate the gaseous phase in the reactor so as to have an oxygen concentration of preferably 5 vol % or lower, more preferably 1 vol % or lower, most preferably 0.1 vol % or lower. This technique is effective in preventing the N-vinyl compound polymer from suffering a decrease in molecular weight or discoloration. Even in the case of treatment under such a low oxygen concentration, use of an organic acid having a boiling point of 140° C. or higher as an acid added preferable because molecular weight decrease prevention effect and coloration prevention effect can surely be achieved.

The oxygen concentration can be easily measured with a commercially available oxygen analyzer such as a galvanic cell type diffusion analyzer or a zirconia sensor type analyzer.

According to the methods of the present invention, the amount of residual monomers in the polymer can easily be diminished to less than 100 ppm to less than 10 ppm. As a result, there is no fear of unpleasant odor and toxicity, and stable products having excellent quality with no change in pH and molecular weight can be obtained.

It is effective to further incorporate an antioxidant or the like into the N-vinyl compound polymer of the invention in order to enhance the long-term stability of the polymer.

If required and necessary, the N-vinyl compound polymer produced by the invention may further contain various additives such as processing stabilizers, plasticizers, dispersants, fillers, age resistors, pigments and hardeners.

The invention will be explained below in more detail by reference to Synthesis Examples and Examples according to the invention. However, the invention should not be construed as being limited by these Examples in any way. In the Synthesis Examples and Examples, the value of K of a vinyllactam polymer was determined by measuring the relative viscosity of a 1 wt % aqueous solution of the polymer with a capillary viscometer at 25° C. and calculating the K value from the viscosity using the following Fikentscher's equations:

$$(\log \eta_{rel})/C = [(75 K_0^2)/(1+1.5 K_0 C)] + K_0$$

$$K = 1{,}000 K_0$$

wherein C indicates the number of grams of the vinyllactam polymer present in 100 ml of the solution, and $\eta_{rel}$ indicates the viscosity of the solution relative to that of the solvent.

SYNTHESIS EXAMPLE 1

3,200 g of water was introduced into a 5 liters flask equipped with a large-impeller stirrer, monomer feed vessel, thermometer, cooling pipe and nitrogen gas inlet pipe.

Nitrogen gas was introduced into the flask, and the contents were heated with stirring so as to maintain the internal temperature of the flask at 75° C. 800 g of N-vinylpyrrolidone and 0.24 g of 2,2-azobis(2-amidino propane) dihydrochloride were supplied to the flask over 30 minutes, and polymerization was conducted. After the reaction mixture was heated at that temperature for 2 hours, the internal temperature was elevated to 90° C. and the mixture was heated for further 30 minutes to complete the polymerization. Thus, an aqueous solution of polyvinylpyrrolidone was obtained. The amount of the unreacted N-vinylpyrrolidone remaining in the aqueous polyvinylpyrrolidone solution obtained was 550 ppm of all the N-vinylpyrrolidone supplied. The value of K of the aqueous polyvinylpyrrolidone solution obtained was 90.

SYNTHESIS EXAMPLE 2

2,700 g of water and 6 g of 10 ppm aqueous copper acetate solution were introduced into the same type of the flask as used in Synthesis Example 1. Nitrogen gas was introduced into the flask, and the contents were heated with stirring so as to maintain the internal temperature of the flask at 100° C. 30 g of 2% ammonia water, 210 g of N-vinylpyrrolidone, and 10 g of 4% aqueous hydrogen peroxide solution were supplied to the flask three times at intervals of 5 minutes to conduct polymerization. The reaction mixture was stirred at that temperature for 2 hours to complete the polymerization. Thus, an aqueous solution of polyvinylpyrrolidone was obtained. The amount of the unreacted N-vinylpyrrolidone remaining in the aqueous polyvinylpyrrolidone solution obtained was 480 ppm. The value of K of the aqueous polyvinylpyrrolidone solution was 31.

EXAMPLE 1

400 g of the aqueous polyvinylpyrrolidone solution obtained in Synthesis Example 1 was introduced into a 500 ml reactor equipped with the same attachment devices as in Synthesis Example 1. Nitrogen gas was introduced into the reactor through the nitrogen gas inlet pipe so that the gaseous phase in the reactor had an oxygen concentration of 1 vol %. Thereafter, the contents were heated to 75° C. After completion of the heating, an aqueous solution prepared by dissolving 0.096 g of oxalic acid in 9.5 g of water was added to the contents and the resulting mixture was stirred for 60 minutes. The aqueous polyvinylpyrrolidone solution thus obtained had a pH of 3.2, and the amount of the unreacted N-vinylpyrrolidone remaining therein was 2 ppm. The value of K of the thus-obtained aqueous polyvinylpyrrolidone solution just after the reaction was 89. When this aqueous solution was stored in air at 50° C. for 2 weeks, the value of K thereof decreased to 85.

EXAMPLE 2

400 g of the aqueous polyvinylpyrrolidone solution obtained in Synthesis Example 1 was introduced into the same type of the reactor as used in Example 1. The contents were heated to 95° C. while regulating the gaseous phase in the reaction vessel so as to have an oxygen concentration of 0.1 vol %. After completion of the heating, an aqueous solution prepared by dissolving 0.096 g of succinic acid in 9.5 g of water was added to the contents and the resulting mixture was stirred for 60 minutes. The aqueous polyvinylpyrrolidone solution thus obtained had a pH of 4.0, and the amount of the unreacted N-vinylpyrrolidone remaining therein was 7 ppm. The value of K of the thus-obtained aqueous polyvinylpyrrolidone solution just after the reaction was 90. When this aqueous solution was stored in air at 50° C. for 2 weeks, the value of K thereof decreased to 86.

Comparative Example 1

The same procedure as in Example 1 was followed, except that the introduction of nitrogen gas was omitted. During the treatment, the gaseous phase in the reaction vessel had an oxygen concentration of 10.0 vol %. The aqueous polyvinylpyrrolidone solution thus obtained had a pH of 3.2, and the amount of the unreacted N-vinylpyrrolidone remaining therein was 2 ppm. The value of K of the thus-obtained aqueous polyvinylpyrrolidone solution just after the reaction was 86. When this aqueous solution was stored in air at 50° C. for 2 weeks, the value of K thereof decreased to 78.

EXAMPLE 3

The aqueous polyvinylpyrrolidone solution obtained in Synthesis Example 2 was introduced into the same type of the reactor as used in Synthesis Example 2. While the contents were maintained at 75° C., an aqueous solution prepared by dissolving 0.096 g of oxalic acid in 9.504 g of water was added thereto. The resulting mixture was stirred for 60 minutes while introducing nitrogen gas through the nitrogen gas inlet pipe so that the gaseous phase in the reaction vessel had an oxygen concentration of 1 vol %. The aqueous polyvinylpyrrolidone solution thus obtained had a pH of 3.1, and the amount of the unreacted N-vinylpyrrolidone remaining therein was 0.7 ppm. The value of K of the thus-obtained aqueous polyvinylpyrrolidone solution just after the reaction was 31.

EXAMPLE 4

The aqueous polyvinylpyrrolidone solution obtained in Synthesis Example 2 was introduced into the same type of the reactor as used in Synthesis Example 2. The contents were heated to 95° C. After completion of the heating, an aqueous solution prepared by dissolving 0.096 g of succinic acid in 9.504 g of water was added thereto. The resulting mixture was stirred for 60 minutes while introducing nitrogen gas through the nitrogen gas inlet pipe so that the gaseous phase in the reaction vessel had an oxygen concentration of 1 vol %. The aqueous polyvinylpyrrolidone solution thus obtained had a pH of 4.0, and the amount of the unreacted N-vinylpyrrolidone remaining therein was 2 ppm. The value of K of the thus-obtained aqueous polyvinylpyrrolidone solution just after the reaction was 31.

EXAMPLE 5

An aqueous solution prepared by dissolving 0.35 g of triethanolamine in 17.15 g of water was added to the aqueous polyvinylpyrrolidone solution obtained in Example 1 just after the reaction. The resulting mixture was stirred for 30 minutes. The aqueous polyvinylpyrrolidone solution thus obtained had a pH of 7.2, and the amount of the unreacted N-vinylpyrrolidone remaining therein was 2 ppm. The value of K of the thus-obtained aqueous polyvinylpyrrolidone solution just after the reaction was 89. When this aqueous solution was stored in air at 50° C. for 2 weeks, the value of K thereof remained at 89.

EXAMPLE 6

An aqueous solution prepared by dissolving 0.36 g of guanidine carbonate in 17.64 g of water was added to the aqueous polyvinylpyrrolidone solution obtained in Example 2 just after the reaction. The resulting mixture was stirred for 30 minutes. The aqueous polyvinylpyrrolidone solution thus obtained had a pH of 8.1, and the amount of the unreacted N-vinylpyrrolidone remaining therein was 7 ppm. The value of K of the thus-obtained aqueous polyvinylpyrrolidone solution just after the reaction was 90. When this aqueous solution was stored in air at 50° C. for 2 weeks, the value of K thereof remained at 90.

EXAMPLE 7

The aqueous polyvinylpyrrolidone solution obtained in Example 5 was cast on a Teflon sheet and then dried in a hot-air drying oven first at 105° C. for 2 hours and subsequently at 150° C. for 10 minutes. The solid thus obtained was pulverized to obtain a polyvinylpyrrolidone powder. The value of K of the polyvinylpyrrolidone obtained was 90, and the amount of the unreacted N-vinylpyrrolidone remaining therein was 2 ppm. A 10 wt % aqueous solution of the polyvinylpyrrolidone powder obtained had a pH of 7.2.

EXAMPLE 8

The aqueous polyvinylpyrrolidone solution obtained in Example 6 was subjected to the same treatment as in Example 7 to obtain a polyvinylpyrrolidone powder. The value of K of the polyvinylpyrrolidone obtained was 90, and the amount of the unreacted N-vinylpyrrolidone remaining therein was 6 ppm. A 10 wt % aqueous solution of the polyvinylpyrrolidone powder obtained had a pH of 8.1.

Comparative Example 2

The aqueous polyvinylpyrrolidone solution obtained in Example 1 was, without pH adjustment, cast on a Teflon sheet and then dried in a hot-air drying oven first at 105° C. for 2 hours and subsequently at 150° C. for 10 minutes. The solid thus obtained was pulverized to obtain a polyvinylpyrrolidone powder. The amount of the unreacted N-vinylpyrrolidone remaining in the polyvinylpyrrolidone obtained was 2 ppm. A 10 wt % aqueous solution of the polyvinylpyrrolidone powder obtained had a pH of 3.1, and the value of K of this polymer had decreased to 82 as compared with 90 in Example 7.

What is claimed is:

1. A method for diminishing a residual N-vinyl compound monomer which comprises adding at least one acid to an aqueous solution of an N-vinyl compound polymer in a reaction vessel, wherein a gaseous phase in the reaction vessel is regulated so as to have an oxygen concentration of 5.0% by volume or lower, and wherein said at least one acid is an organic acid having a boiling point of 140° C. or higher.

2. A method for diminishing a residual N-vinyl compound monomer which comprises adding at least one acid to an aqueous solution of an N-vinyl compound polymer in a reaction vessel, wherein a gaseous phase in the reaction vessel is regulated so as to have an oxygen concentration of 5.0% by volume or lower, and wherein said at least one acid is organic acid having at least two carboxyl groups in the molecule.

3. The method as claimed in claim 1 or 2, wherein said N-vinyl compound is an N-vinyllactam.

4. The method as claimed in claim 3, wherein said N-vinyl compound is N-vinylpyrrolidone.

5. The method as claimed in claim 2, wherein said acid is an organic acid a boiling point of 140° C. or higher.

6. The method as claimed in claim 5, wherein said N-vinyl compound is an N-vinyllactam.

7. The method as claimed in claim 6, wherein said N-vinyl compound is N-vinylpyrrolidone.

* * * * *